United States Patent [19]

Carcia

[11] Patent Number: 5,068,022

[45] Date of Patent: Nov. 26, 1991

[54] PROCESS FOR SPUTTERING MULTILAYERS FOR MAGNETO-OPTICAL RECORDING

[75] Inventor: Peter F. Carcia, Wilmington, Del.

[73] Assignee: E. I. Du Pont de Nemours and Company, Wilmington, Del.

[21] Appl. No.: 441,499

[22] Filed: Nov. 27, 1989

[51] Int. Cl.$^5$ .............................................. C23C 14/34
[52] U.S. Cl. .............................. 204/192.15; 204/192.2
[58] Field of Search ............ 204/192.15, 192.2, 192.14

[56] References Cited

U.S. PATENT DOCUMENTS

| | | | |
|---|---|---|---|
| 3,399,129 | 4/1968 | Flur et al. .......................... | 204/192.2 |
| 4,529,651 | 7/1985 | Kitoo et al. ................... | 204/192.2 X |
| 4,587,176 | 5/1986 | Carcia .............................. | 428/615 X |
| 4,766,034 | 8/1988 | Sato et al. ..................... | 204/192.2 X |

FOREIGN PATENT DOCUMENTS 304873 3/1989 European Pat. Off. .
61-242321 10/1986 Japan .

OTHER PUBLICATIONS

Zeper et al., J. Appl. Phys. 65, 4971 (1989).
Greidanus, Appl. Phys. Lett. 54, 2481 (1989).
Ochiai et al., Jap. J. Appl. Phys. 28, L659 (1989).
Ochiai et al., Digest of the Int'l Mag. Conf.–1989, Wash., D.C.
Hashimoto et al., J. Appl. Phys. 66(10), 4909 (1989).

*Primary Examiner*—Nam X. Nguyen

[57] ABSTRACT

An improved sputtering process for making a platinum/cobalt (Pt/Co) multilayer film comprised of alternating layers of platinum and cobalt, said improvement comprising using as the sputter gas krypton, xenon or a mixture thereof.

12 Claims, No Drawings

5,068,022

PROCESS FOR SPUTTERING MULTILAYERS FOR MAGNETO-OPTICAL RECORDING

BACKGROUND OF THE INVENTION

1. Field of the Invention

This invention relates to an improved process for making sputtered platinum/cobalt multilayer films and to the films made by this method.

2. Reference

Thin films with perpendicular magnetic anisotropy are potential candidates in high density magnetic and magneto-optical recording. Examples of materials useful in preparing such films include the oxide garnets and ferrites, amorphous rare-earth transition metal alloys, metal alloys such as CoCr, and metal multilayers of Pt/Co and Pd/Co, as disclosed in P. F. Carcia, U.S. Pat. No. 4,587,176.

In order to be useful for magneto-optical recording, a material must have additional attributes besides perpendicular magnetic anisotropy. These requirements include a square hysteresis loop, a sufficient Kerr effect, a large room temperature coercivity $H_c$, and switching characteristics compatible with available laser power and magnetic field strength. All these necessary properties are exhibited by evaporated Pt/Co and Pd/Co multilayers as described in recent publications, see, e.g., W. B. Zeper et al., J. Appl. Phys. 65, 4971 (1989) and F. J. A. M. Greidanus, Appl. Phys. Lett. 54, 2481, (1989).

Pt/Co multilayers are preferred over Pd/Co for magneto-optical recording because they exhibit a higher Kerr effect. Sputtering is the preferred manufacturing process for preparing these multilayer films because it is simpler than other processes and the results obtained are more reproducible. However, sputtered Pt/Co multilayers have coercivities too small for magneto-optical recording. For example, Ochiai et al., Jap. J. Appl. Phys. 28, L659 (1989) and Ochiai et al., Digest of the Int'l. Mag. Conf. -1989. Wash., D.C., report $H_c$ of only 100-350 Oe (8-28 kA/m) for sputtered Pt/Co multilayers which they prepared by using argon as the sputter gas. These values of $H_c$ are less than or the same order of magnitude as that used as a write-magnetic field, which is typically about 40 kA/m. As a result, write-magnetic fields can change nearby previously written information in known Pt/Co multilayers when writing new information.

In contrast, evaporated Pt/Co multilayers have $H_c$ of about 1000 Oe (80 kA/m), which is sufficiently high to preserve adjacent, previously-written information during a writing process.

Y. Ochiai et al., EP 0304873 disclose studies of sputtered Pt/Co multilayers including the use of underlayers to increase $H_c$. However, generally only marginal improvements in $H_c$ were achieved and the singular best result of 700 Oe (56 kA/m) requires a 1000 Å (100 nm) thick Pt underlayer. This is impractical for most magneto-optical recording applications because it prohibits reading and writing information from the substrate side and the large heat capacity and thermal diffusivity of such a thick Pt layer will likely prevent writing with the limited power available with current solid-state lasers.

All known references to sputtered Pt/Co multilayers, and to sputtered metal multilayers in general, disclose the use of argon as the sputter gas.

The goal of the instant invention is to provide a process for directly sputtering Pt/Co multilayers with high coercivities and suitable for magneto-optical recording.

SUMMARY OF THE INVENTION

This invention provides an improved sputtering process for making a platinum/cobalt (Pt/Co) multilayer film comprised of alternating layers of platinum and cobalt, said improvement comprising using as the sputter gas krypton, xenon or a mixture thereof. Preferred is a sputtering gas pressure of about 2 to about 12 mTorr (about 0.27 to about 1.6 Pa). This process is especially useful for preparing a Pt/Co multilayer film with a large magnetic coercivity and suitable for magneto-optical recording, wherein all said cobalt layers have substantially the same thickness $d_{Co}$ and all said platinum layers have substantially the same thickness $d_{Pt}$, $d_{Co}$ is less than about 12 Å (1.2 nm), $d_{Pt}$ is less than about 24 Å (2.4 nm) and the total thickness of the multilayer film is less than about 750 Å (75 nm).

This invention also provides the Pt/Co multilayer film made by this process. Preferred is the multilayer film wherein all said cobalt layers have substantially the same thickness $d_{Co}$ and all said platinum layers have substantially the same thickness $d_{Pt}$, $d_{Co}$ is less than about 12 Å (1.2 nm), $d_{Pt}$ is less than about 24 Å (2.4 nm) and the total thickness of the multilayer film is less than about 750 Å (75 nm). Especially preferred is the multilayer film wherein $d_{Co}$ is from about 2 to about 5 Å (0.2 to about 0.5 nm) and $d_{Pt}/d_{Co}$ is from about 1 to about 5. The multilayer films of the instant invention have much larger magnetic coercivities than multilayer films with the same $d_{Co}$, $d_{Pt}$ and number of layers that are sputtered in argon. As a result, the multilayer films of the instant invention are useful for magneto-optical recording, in contrast to those sputtered in argon.

DETAILED DESCRIPTION OF THE INVENTION

The instant invention provides an improved sputtering process for making a platinum/cobalt (Pt/Co) multilayer film by using krypton, xenon or a mixture thereof as a sputter gas. The film is produced by sputtering alternate layers of platinum and cobalt. Preferably all cobalt layers within the multilayer film have substantially the same thickness $d_{Co}$ and all said platinum layers within the multilayer film have substantially the same thickness $d_{Pt}$. Preferably $d_{Co}$ is L less than about 12 Å (1.2 nm), $d_{Pt}$ is less than about 24 Å (2.4 nm) and the total thickness of the multilayer film is less than about 750 Å (75 nm). Most preferably $d_{Co}$ is from about 2 to about 5 Å (0.2 to about 0.5 nm) and $d_{Pt}/d_{Co}$ is from about 1 to about 5. The preferred ranges set forth herein identify structures having the most suitable characteristics for magneto-optical recording.

The multilayer film can be deposited as alternate layers of Pt and Co upon a variety of substrates, e.g., glass, polished silicon, polished sapphire ($Al_2O_3$), paper, aluminum, or such polymeric materials as polyimide, polystyrene, polyethylene, poly(ethylene terephthalate), and others.

DC or RF magnetron sputtering can be used. The substrates are typically placed on a rotating table and exposed to the Pt and Co sputtering fluxes in alternate, repeating fashion. The motion of the table can be programmed to permit the table to pause for preselected periods during Pt and Co deposition. In this manner, the relative thicknesses of Pt and Co can be controlled.

Preferably the Co and Pt targets are physically separated to eliminate the possibility of overlap of their sputtered fluxes.

The sputter gas is krypton, xenon or a mixture thereof. Preferred is a sputtering gas pressure of about 2 to about 12 mTorr (about 0.27 to about 1.6 Pa).

The instant process is believed to result in Pt/Co interfaces that are sharper or more clearly defined than those obtained when argon is used as the sputter gas. These sharper interfaces are believed to result in a large interfacial contribution (see e.g., P. F. Carcia et al., Appl. Phys. Lett. 47, 178 (1985)) to the perpendicular magnetic anisotropy (K) and consequently the magnetic coercivity ($H_c = 2$ K/M) is also large. In general, the origin of lower $H_c$'s in sputtered films of the art is believed to be due to less sharp or more chemically mixed interfaces than in evaporated films. Generally, sputtering involves more energetic particles than evaporation. The most energetic, and therefore the most potentially disruptive particles for multilayer interfaces, are sputter gas ions (e.g., $Ar^+$) that recoil from the larger mass Pt target and bombard the growing film. Because they are almost immediately neutralized, these ions are commonly referred to as energetic neutrals. Both their flux and energy are proportional to the mass difference between the target atom and the sputter gas atom. That is, the most probable recoil energy of the sputter gas atom is given approximately by $$E = [(M_t - M_g)^2 / (M_t + M_g)^2] E_o, \; M_t > M_g$$

where $E_o$ is the initial energy of the gas ion, and $M_t$ and $M_g$ are respectively the atomic masses of the target and the sputtering gas. Some nonreactive gases that can be used in sputtering include Ne, Ar, Kr, and Xe with respective masses of 20, 40, 83, and 131. Since the mass of Pt is 195, it is possible to control both the energy and the flux of bombarding gas atoms by the selection of the sputter gas.

EXAMPLES OF THE INVENTION

All films were prepared by DC magnetron sputtering from separate 6.5" (16.5 cm) diameter Co and Pt targets. Forty watts was the sputtering power to each target. Substrates were on a rotatable table and were alternately coated by each metal. The substrate to target distance was about 3" (7.6 cm). There was no significant difference in results obtained with a glass substrate and those obtained with a polished silicon substrate. Glass substrates were used for the examples and experiments described herein. During deposition the rotating table was programmed to remain stationary under each target for a given time by controlling the substrate motion with a computer. A residence time under the Co target, $t_{Co}$, of 1 second results in a Co thickness of about 3–4 Å (0.3–0.4 nm). A residence time under the Pt target, $t_{Pt}$, of 3–6 seconds results in a Pt thickness of 10–20 Å (1.0–2.0 nm). Prior to deposition the vacuum chamber was pumped to a background pressure of about $2 \times 10^{-7}$ Torr ($2.7 \times 10^{-5}$ Pa) before admitting the sputtering gas.

A pair of adjacent layers of Pt and Co is referred to as a bilayer. The number of Pt layers and the number of Co layers are of course each equal to the number of bilayers, N.

All the multilayer films disclosed below have an easy axis of magnetization perpendicular to the film plane and a magnetic squareness equal to one, i.e., that is, the remanent magnetization at zero applied field equals the saturation value.

EXAMPLES 1–4

Four samples each containing ten bilayers of Pt and Co were sputtered using krypton as the sputter gas and sputter gas pressures of 5, 7, 8 and 10 mTorr respectively. The residence time under the Co target, $t_{Co}$, was 1 second and the residence time under the Pt target, $t_{Pt}$, was 3 seconds. The actual thicknesses $d_{Pt}$ and $d_{Co}$ are shown in Table I. The $H_c$'s obtained increase with increasing sputter gas pressure and are also shown in Table I. All the $H_c$'s obtained exceed 600 Oe (48 kA/m). The polar Kerr rotation $\theta$ of these four films ranged from about 0.25 to about 0.30 degrees. These films would be useful for magneto-optical recording.

EXAMPLES 5–8

Four samples each containing five, ten, fifteen and twenty bilayers of Pt and Co respectively were sputtered using krypton as the sputter gas and a sputter gas pressures of 7 mTorr. The residence time under the Co target, $t_{Co}$, was 1 second and the residence time under the Pt target, $t_{Pt}$, was 4 seconds. The actual thicknesses $d_{Pt}$ and $d_{Co}$ are shown in Table I. The $H_c$'s obtained are independent of the number of multilayers N for N of 10 or more and are also shown in Table I. All the $H_c$'s obtained exceed 570 Oe (46 kA/m) and these films would be useful for magneto-optical recording.

EXAMPLE 9

A sample containing twenty-five bilayers of Pt and Co was sputtered using xenon as the sputter gas and a sputter gas pressure of 10 mTorr. The residence time under the Co target, $t_{Co}$, was 1 second and the residence time under the Pt target, $t_{Pt}$, was 4 seconds. The actual thicknesses $d_{Pt}$ and $d_{Co}$ are shown in Table I. The $H_c$ obtained was 1495 Oe (120 kA/m) and this film would be useful for magneto-optical recording.

EXAMPLE 10

A sample containing forty bilayers of Pt and Co was sputtered using xenon as the sputter gas and a sputter gas pressure of 5 mTorr. The residence time under the Co target, $t_{Co}$, was 1 second and the residence time under the Pt target, $t_{Pt}$, was 3 seconds. The actual thicknesses $d_{Pt}$ and $d_{Co}$ are shown in Table I. The $H_c$ Obtained was 785 Oe (62 kA/m) and this film would be useful for magneto-optical recording.

COMPARATIVE EXPERIMENTS A-B

Two samples each containing ten bilayers of Pt and Co were sputtered using argon as the sputter gas and sputter gas pressures of 5 and 10 mTorr respectively. The residence time under the Co target, $t_{Co}$, was 1 second and the residence time under the Pt target, $t_{Pt}$, was 3 seconds. The actual thicknesses $d_{Pt}$ and $d_{Co}$ are shown in Table I. The $H_c$'s obtained are also shown in Table I. These films would not be useful for magneto-optical recording.

EXAMPLE 11

The thermomagnetic recording properties of a Pt/Co multilayer disc were measured for a 5.25" (13.3 cm) diameter glass disc coated with a pregrooved layer, formed by a photopolymerizable acrylate-base lacquer, on which was deposited approximately 80 nm of an AlN layer. The Pt/Co multilayer recording element, directly deposited on the AlN layer, consisted of 10 bilayers of $d_{Pt}=11.0$ A (1.1 nm) and $d_{Co}=3.5$ A (0.35 nm). The grooves provide a guide track for the laser light and the AlN dielectric layer enhances the overall magneto-optical figure-of-merit $R\theta^2$, where R is the reflectivity and $\theta$ is the Kerr rotation angle. The Pt/Co multilayer was formed by sputtering Pt and Co layers alternately with krypton gas at a pressure of 7 mTorr (0.93 Pa). The magnetic coercivity was about 800 Oe (64 kA/m).

In a number of thermomagnetic experiments with a disc velocity of 5 m/s, a bandwidth of 30 kHz, a frequency of 1 MHz, a laser pulse width of 400 ns, a writing power of 4.7 mW, a write field of 300 Oe (23 kA/m), and a read power of 1.2 mW, magnetic domains were written and stored in this recording element. Writing and reading of magnetic domains were performed with substrate incident radiation from a AlGaAs laser having a wavelength of approximately 820 nm. The signal-to-noise ratio was 10.4 dB and the write noise was negligibly small.

TABLE 1

| Example/ Exp't | Sputter Gas | Press. (mTorr) | N | $t_{Co}(s)$ (#) | $d_{Co}$ (A) | $t_{Pt}(s)$ | $d_{Pt}$ (A) | $H_c$(Oe) |
|---|---|---|---|---|---|---|---|---|
| 1 | Kr | 5 | 10 | 1 | 3.5 | 3 | 11.0 | 620 |
| 2 | Kr | 7 | 10 | 1 | 3.1 | 3 | 10.1 | 768 |
| 3 | Kr | 8 | 10 | 1 | 3.5 | 3 | 11.0 | 800 |
| 4 | Kr | 10 | 10 | 1 | 3.5 | 3 | 11.0 | 925 |
| 5 | Kr | 7 | 5 | 1 | 4 | 3.5 | 3.0 | 573 |
| 6 | Kr | 7 | 10 | 1 | 3.3 | 4 | 12.7 | 775 |
| 7 | Kr | 7 | 15 | 1 | 3.5 | 4 | 13.1 | 775 |
| 8 | Kr | 7 | 20 | 1 | 3.6 | 4 | 13.5 | 800 |
| 9 | Xe | 10 | 25 | 1 | 2.6 | 4 | 12.6 | 1495 |
| 10 | Xe | 5 | 40 | 1 | 3.6 | 3 | 11.1 | 785 |
| A | Ar | 5 | 10 | 1 | 3.8 | 3 | 11.3 | 265 |
| B | Ar | 10 | 10 | 1 | 3.0 | 3 | 12.6 | 360 |

The invention being claimed is:

1. An improved sputtering process for making a platinum/cobalt multilayer film comprised of alternating layers of platinum and cobalt, the improvement comprising using krypton, xenon or a mixture thereof as the sputter gas.

2. The process of claim 1 wherein the sputter gas is krypton.

3. The process of claim 1 wherein the sputter gas is xenon.

4. The process of claim 1 wherein the sputter gas has a pressure about 2 to about 12 mTorr (about 0.27 to about 1.6 Pa).

5. The process of claim 4 wherein all said cobalt layers have substantially the same thickness $d_{Co}$ and all said platinum layers have substantially the same thickness $d_{Pt}$, $d_{Co}$ is less than about 12 A (1.2 nm), $d_{Pt}$ is less than about 24 A (2.4 nm) and the total thickness of the multilayer film is less than about 750 A (75 nm).

6. The process of claim 5 wherein $d_{Co}$ is from about 2 to about 5 A (0.2 to about 0.5 nm) and $d_{Pt}/d_{Co}$ is from about 1 to about 5.

7. The process of claim 6 wherein the sputter gas is krypton.

8. The process of claim 6 wherein the sputter gas is xenon.

9. The process of claim 1 wherein all said cobalt layers have substantially the same thickness $d_{Co}$ and all said platinum layers have substantially the same thickness $d_{Pt}$, $d_{Co}$ is less than about 12 A (1.2 nm), $d_{Pt}$ is less than about 24 A (2.4 nm) and the total thickness of the multilayer film is less than about 750 A (75 nm).

10. The process of claim 9 wherein $d_{Co}$ is from about 2 to about 5 A (0.2 to about 0.5 nm) and $d_{Pt}/d_{Co}$ is from about 1 to about 5.

11. The process of claim 10 wherein the sputter gas is krypton.

12. The process of claim 10 wherein the sputter gas is xenon.

* * * * *